United States Patent [19]

Carlström et al.

[11] Patent Number: 5,758,906
[45] Date of Patent: Jun. 2, 1998

[54] SOCKETS SERVING FOR THE CONNECTION OF TWO PLASTIC PIPES

[75] Inventors: Börge Carlström, Oberwil, Switzerland; Peter Kunze, Neubrandenburg, Germany; Johann Mitteregger, Brückl, Austria

[73] Assignee: Hobas Engineering AG, Basel, Switzerland

[21] Appl. No.: 499,731

[22] Filed: Jul. 7, 1995

[30] Foreign Application Priority Data

Jul. 8, 1994 [CH] Switzerland .................. 02 182/94-0

[51] Int. Cl.⁶ .................................................. F16L 17/03
[52] U.S. Cl. .............................. 285/112; 385/369; 385/423
[58] Field of Search ........................ 385/110, 112, 385/423, 369, 383

[56] References Cited

U.S. PATENT DOCUMENTS

| | | | |
|---|---|---|---|
| 4,098,528 | 7/1978 | Stanley | 285/369 X |
| 4,173,362 | 11/1979 | Glover et al. | 285/423 X |
| 4,174,125 | 11/1979 | Wyss | 285/423 X |
| 4,213,641 | 7/1980 | Bennett | 285/423 X |
| 4,221,405 | 9/1980 | Stonitsch | 285/110 X |
| 4,329,193 | 5/1982 | Sznopek et al. | 285/423 X |
| 4,513,996 | 4/1985 | Jost | 285/110 |
| 4,643,465 | 2/1987 | Green et al. | 285/369 X |
| 4,671,541 | 6/1987 | Webb et al. | 285/112 |
| 5,078,432 | 1/1992 | Seiter | 285/383 X |
| 5,094,492 | 3/1992 | Levivier | 285/112 X |
| 5,330,238 | 7/1994 | Carlstrom | 285/369 X |
| 5,433,484 | 7/1995 | Ewen et al. | 285/423 X |

FOREIGN PATENT DOCUMENTS

| | | | |
|---|---|---|---|
| 74 793 | 1/1961 | France . | |
| A 2 133 173 | 11/1972 | France . | |
| 2 367 976 | 5/1978 | France . | |
| 2 439 077 | 5/1980 | France . | |
| 28 24 968 | 12/1979 | Germany . | |
| 125526 | 9/1979 | Japan | 285/383 |
| 904622 | 8/1962 | United Kingdom | 285/110 |

*Primary Examiner*—Dave W. Arola
*Attorney, Agent, or Firm*—McGlew & Tuttle

[57] ABSTRACT

The socket has an essentially cylindrical outer layer of glass fiber-reinforced plastic and a sealing sleeve arranged in a recess in the outer layer. This sealing sleeve has, between the two socket ends, a rib serving as a stop for the ends of the two pipes to be connected to one another. Here, the outer layer forms a first and a second hollow cylindrical, dimensionally stable edge section, the first of which is substantially longer than the second. That end of such a socket which is formed by the longer edge section can be pushed relatively easily onto a first pipe and can also be nondetachably bonded thereto by means of an adhesive. The second pipe having the same diameter can then be inserted into the socket end formed by the shorter edge section. Here, the relatively short edge section makes it possible to insert the second pipe into the socket with a tight seal even when the axes of socket and pipe do not coincide but make a small angle with one another.

17 Claims, 2 Drawing Sheets

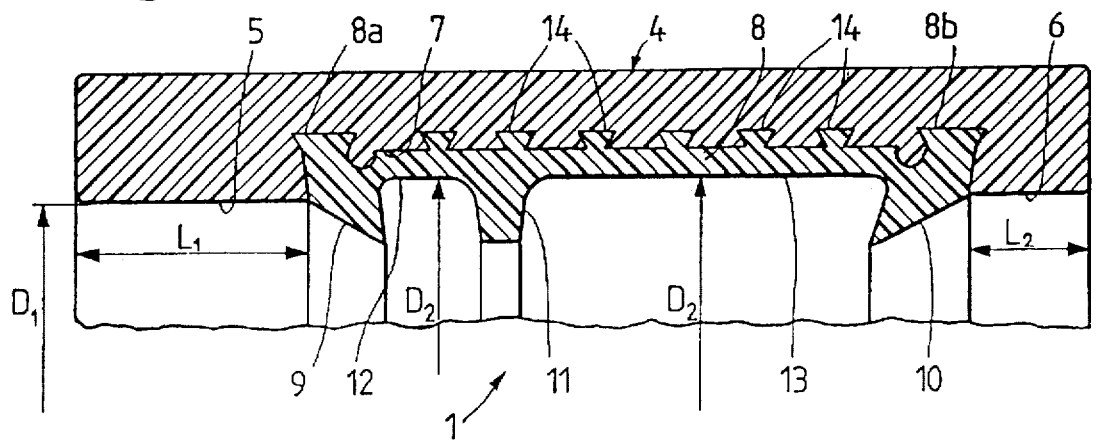
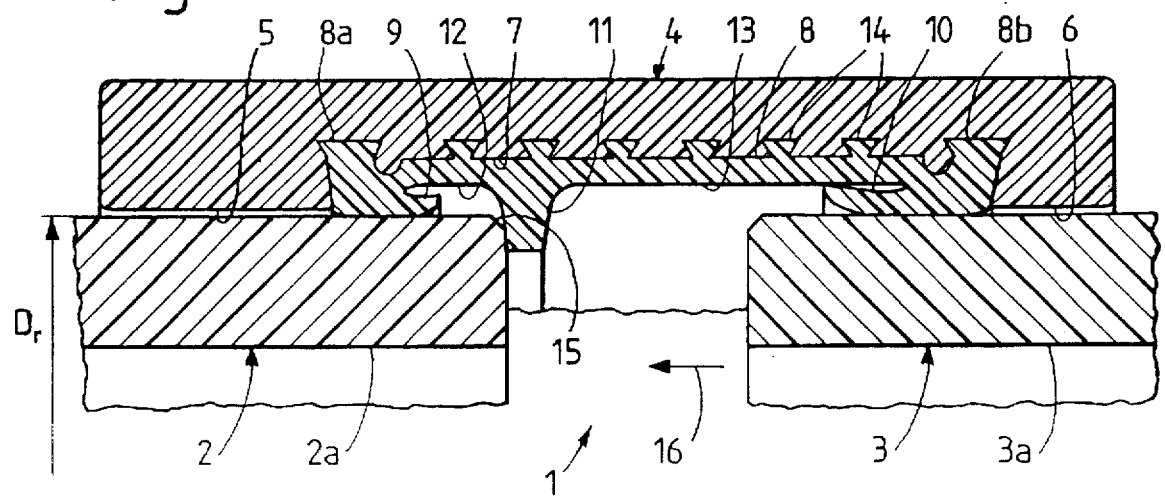
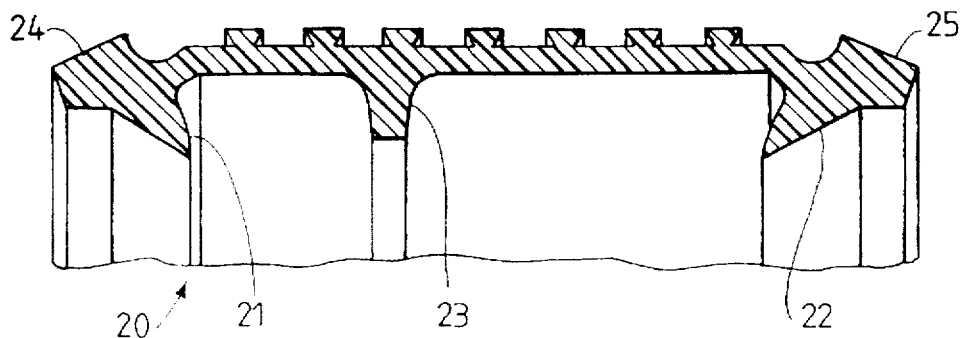

SOCKETS SERVING FOR THE CONNECTION OF TWO PLASTIC PIPES

FIELD AND BACKGROUND OF THE INVENTION

Sockets are used for connecting two pipes. The sockets used are either cylindrical pipe sections into which one end of a pipe can be screwed or inserted from each side and fixed in some manner. However, during the production, it is also possible to provide one end of a pipe with a widened section which serves as a socket and into which that end of a similarly formed pipe which is without an extended section is then inserted. These two methods are also known in the case of plastic pipes. The advantages and the disadvantages of these two socket types are also known.

In order to ensure a tight connection between the pipe and the sleeve, either the pipe or the socket can be provided with sealing materials. It is known that a groove in which a sealing material, such as, for example, an O-ring or something similar, is housed can be made in the vicinity of the pipe end. Since this reduces the wall thickness of the pipe, which is undesirable particularly in the case of pipes which are laid in the ground by the pressure method and should therefore be avoided, sockets which consist of a resilient sealing inner part which may be provided with lips and a coating of solid material which is applied thereon are also known. Such sockets have two identically formed sections which are essentially of equal length and each of which serves for accepting one pipe end.

The pipes to be connected to one another by means of sockets of the type described above are very often laid in a prepared pipe bed whose solid surface is irregular. Consequently, the ends of the two pipes do not always rest exactly opposite one another and their axes therefore make a small angle with one another.

This relative displacement of the pipe axes of two pipes to be connected to one another is the reason why stresses occur in the region of the pipe coupling when known sockets are used, very often resulting in delamination and cracking in the socket and in the end sections of the pipe. In this case, it is also not possible to achieve optimum sealing of the coupling with the known sockets.

SUMMARY OF THE INVENTION

The present invention relates to a socket which does not have the disadvantages of the above-mentioned sockets, i.e. in particular a socket by means of which two pipes whose axes do not coincide can be connected to one another without significant loss of tightness.

This novel socket serves for connecting two plastic pipes and has sealing means and an essentially hollow cylindrical outer layer which has a first and second, generally cylindrical edge section, each of which serves to receive a plastic pipe and each of which has an internal diameter $D_1$. The outer layer has, on its inner surface, an annular recess which is arranged between the two stated edge sections and in which an at least partially deformable sealing sleeve forming the sealing means fits, wherein the first cylindrical edge section is longer than the second one.

The socket according to the invention is suitable in particular for connecting two glass fiber-reinforced plastic pipes and can be connected to different types of pipes. Thus, the socket can be used, for example, for connecting two pipes which have the same external diameter over their entire length. However, the socket can of course also be used for connecting two pipes which have a cylindrical end section with a diameter which is smaller than that of the remaining pipe section. This permits in particular the production of a pipeline having a constant external diameter, i.e. a pipeline without outer beads or ribs.

The various embodiments of the socket according to the invention form the subject of the dependent claims.

The invention furthermore relates to a process for the production of sockets according to the invention.

BRIEF DESCRIPTION OF THE DRAWINGS

An embodiment of the invention is described below with reference to the attached drawings. In the drawings, FIG. 1 shows a part of a longitudinal section of a socket accord to the invention, having a first sealing sleeve, FIG. 2 shows a longitudinal section through the sleeve shown in FIG. 1 and through the two end sections of two pipes to be connected to one another, FIG. 3 shows a longitudinal section through a part of a second sealing sleeve.

DETAILED DESCRIPTION OF THE PREFERRED EMBODIMENTS

Figure 4:
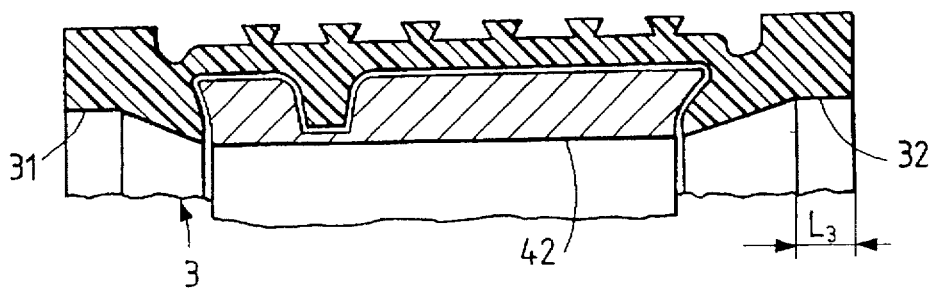
FIG. 4 shows a part of a longitudinal section through a third sealing sleeve and through a support sleeve supporting it.

The socket shown in FIGS. 1 and 2, and denoted as a whole by 1, and intended for connecting the two plastic pipes 2 and 3, has an essentially hollow cylindrical outer layer 4 which is preferably formed from glass fiber-reinforced plastic and has a first and second cylindrical edge section 5 and 6, each having an internal diameter $D_1$. This hard, i.e. scarcely deformable, outer layer 4 has, in its inner surface, an annular recess 7 which is arranged between the two stated end sections 5 and 6 and in which a sealing sleeve 8 forming the sealing material fits. As is furthermore clearly evident from FIGS. 2 and 3, the first cylindrical edge section 5 is substantially longer than the second edge section 6.

To enable the socket 1 to be pushed onto the two pipes 2 and 3, these each have a pipe end section 2a and 3a, respectively, whose external diameter $D_r$ is slightly smaller than the internal diameter $D_1$ of the two edge sections 5 and 6. The internal diameter $D_1$ is, for example, at most about 0.5% greater than the external diameter $D_r$ of the plastic pipes 2 and 3.

The length $L_1$ of the first edge section 5 should preferably be chosen so that the relationship $$L_1 = 40 (D_1 - D_r)$$

or $$L_1 = 80 (D_1 - D_r)$$

is fulfilled.

As already mentioned, the first edge section 5 is in any case longer than the second one. Here, the length $L_1$ of the first edge section 5 is at least twice, and preferably at least three times, as long as the length $L_2$ of the second edge section 6.

The sealing sleeve 8 consists of a moldable, sealing plastic, for example of polyurethane, which extends over the entire length of the recess 7. The sleeve has, at its two edges forming the end faces, a radial height which corresponds approximately to the depth of the recess 7 at this point, i.e. an internal diameter which essentially corresponds to the internal diameter $D_1$ of the edge sections 5 and 6, so that, at its radial end faces, the sealing sleeve 8 is flush with the inner surface of the cylindrical edge sections 5 and 6.

Running from each of these two end faces is an annular, sawtooth-like sealing lip 9 and 10 which projects radially beyond the inner surface of the edge regions 5 and 6, projects into the interior of the socket and forms an internal diameter which becomes smaller with increasing distance from the socket edge.

The sealing sleeve 8 furthermore has a rib 11 which serves as a stop for the two pipes 2 and 3 to be connected to one another and which projects into the interior of the socket. The preferably cylindrical section of the sealing sleeve 8, which section lies between the two sealing lips 9 and 10, is divided by this rib 11 into a shorter part 12 facing the first edge section 5 and a longer part 13 facing the second edge section 6.

As is evident from the drawings, the internal diameter $D_2$ of these annular parts 12 and 13 is slightly larger than the internal diameter $D_1$ of the cylindrical edge sections 5 and 6 and thus also greater than the external diameter $D_r$ of the pipe end sections 2a and 3a. Hence, sufficient space has been created in this inner region for absorbing the volume of the sealing sleeve 8 displaced by the pressure during coupling of the two pipes 2 and 3 and for ensuring satisfactory sealing of the pipe coupling.

The drawings also show that the sealing sleeve 8 possesses, on its inner surface resting on the base of the recess 7, a plurality of annular ribs 14 arranged between the two annular end faces 8a and 8b and projecting into the outer layer 4.

The use of the socket according to the invention will now be described briefly below.

In a first step, the socket 1 is pushed onto the first pipe 2, the end pushed on being the end formed by the longer section 5. If the internal diameter $D_1$ is slightly larger than the external diameter $D_r$ of the pipe 2, the socket 1 can be readily pushed onto the pipe end section 2a until the rib 11 comes up against the pipe end. The bevel 15 shown in FIG. 2 and present at the pipe end furthermore makes it possible for the socket 1 to be pushed onto the pipe 2 without great difficulty in spite of the sealing lip 9. During this pushing-on process, the sealing sleeve 8 is deformed, the sealing lip 9 being compressed and bent. If the exterior of the pipe or the interior of the socket is finally also provided with an adhesive, the socket 1 can be connected permanently and nondetachably to the pipe 2 so that the socket axis coincides with the pipe axis.

In a second step, the second pipe 3 is then pushed into the socket 1 in the direction indicated by the arrow 16, through the socket end formed by the shorter edge section 6, in this insertion process, too, the sealing lip 10 being compressed and the pipe 3 being pushed as far as the rib 11.

The dimensions $D_1$, $D_2$ and $D_r$ and the length of the cylindrical part 13 on the right side of the socket 1 permit easy introduction of the pipe 3 into the socket 1, ensure a tight seal by the sawtooth-like sealing lip 10 and, owing to the relatively short, dimensionally stable edge section 6, make it possible for the socket axis to make a small angle with the axis of the pipe 3.

For optimal sealing of the right socket end, the sealing lip 10 facing the second edge section 6 is preferably larger than the sealing lip 9 facing the first edge section 5 and has, for example, about 20% more sealing material than it.

As shown in FIGS. 3 and 4, sealing sleeves according to the invention may have shapes which differ from one another.

As in the case of the sealing sleeve 8, the sealing sleeve shown in FIG. 3 and denoted as a whole by 20 has a sawtooth-like sealing lip 21 or 22 at each of its two ends and a rib 23 which is arranged between the sealing lips and serves as a stop for the two pipes. However, in contrast to the sealing sleeve 8, the sealing sleeve 20 has a conical bevel 24 or 25 at each of its two ends.

The sealing sleeve 30 shown in FIG. 4 differs from the two above-mentioned sealing sleeves essentially in that it additionally has a cylindrical flange 31 or 32 at each of its ends. Here, the flange 32 preferably has a length $L_3$ which is at most half as long as $L_2$.

Figure 5:
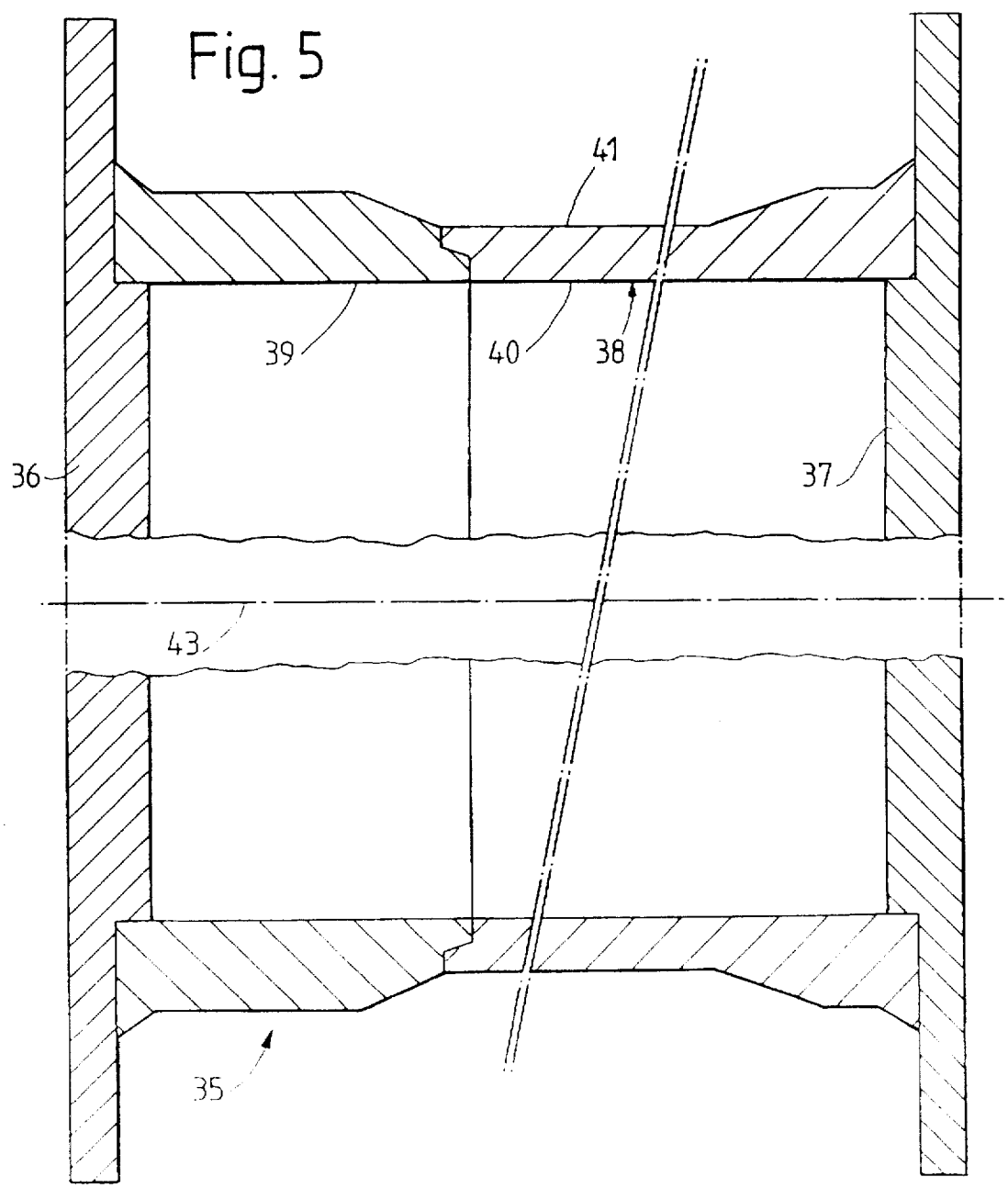
FIG. 5 shows a vertical section through a centrifugal drum for the production of the socket according to the invention.

The socket according to the invention can be produced in a very simple manner, as described below with reference to FIGS. 4 and 5.

The centrifugal drum which can be used for the production of a socket according to the invention and is denoted as a whole by 35 has two plates 36 and 37 and a metallic mold ring 38 which is connected or can be connected to these plates. The mold ring consists of two parts 39 and 40 which can be separated from one another.

In the assembled state, the two parts 39 and 40 form a recess 41 into which the sealing sleeve to be coated with an outer coating fits, the sleeve being supported for this purpose by a metallic support sleeve 42, which is shown in FIG. 4.

A socket according to the invention is produced by a method in which the sealing sleeve is fastened on the mold ring 38, the mold ring 38 is then allowed to rotate about the axis 43 and glass fibers impregnated with plastic particles are wound on the sealing sleeve during the rotation, making it possible to produce an outer layer which has essentially the shape of the outer layer 4. After a subsequent curing phase, the centrifugal drum 35 is then opened and the socket is removed from the mold parts 39 and 40.

If the sealing sleeve to be coated has a flange at each of its ends, said flanges then serve in particular for preventing the penetration of plastic particles and glass fibers between the mold ring 38 and the sealing lips.

Finally, it should also be pointed out in this context that the annular ribs shown in FIGS. 1 and 2 and denoted by 14 serve in particular for ensuring a firm and nondetachable connection between the sealing sleeve and the outer layer applied thereon.

We claim:

1. A pipe connector socket comprising:
   an outer layer with first and second cylindrical edge sections, each of said first and second cylindrical edge sections having an internal diameter $D_1$, a first axial length $L_1$ of said first cylindrical edge section being larger than a second axial length $L_2$ of said second cylindrical edge section, said outer layer having an inner surface defining an inner annular recess between said first and second cylindrical edge sections;
   a deformable sealing sleeve positioned inside said outer layer and in said annular recess, said sealing sleeve including rib means extending radially inward and for blocking movement of a pipe though said sealing sleeve past said rib means, said rib means dividing said sealing sleeve into a first part adjacent said first cylindrical edge section and a second part adjacent said second cylindrical edge section, said first part being shorter than said second part.

2. A pipe connector socket in accordance with claim 1, wherein:

first and second pipes are insertable into said first and second cylindrical edge sections, the first and second pipes having an external diameter $D_r$;

said first axial length $L_1$ being defined by $$L_1 = 40 (D_1 - D_r).$$

3. A pipe connector socket in accordance with claim 1, wherein:

first and second pipes are insertable into said first and second cylindrical edge sections, the first and second pipes having an external diameter $D_r$;

said first axial length $L_1$ being defined by $$L_1 = 80 (D_1 - D_r).$$

4. A pipe connector socket in accordance with claim 1, wherein:

said first axial length $L_1$ is at least equal to twice said second axial length $L_2$.

5. A pipe connector socket in accordance with claim 1, wherein:

said sealing sleeve includes a plurality of annular ribs extending radially outward, said plurality of annular ribs project into said outer layer.

6. A pipe connector socket in accordance with claim 1, wherein:

said sealing sleeve includes radial faces, an internal diameter of said radial faces being substantially identical to said internal diameter $D_1$ of said first and second cylindrical edge sections, and said internal diameter of said radial faces being substantially flush with said internal diameter $D_1$ of said first and second cylindrical edge sections;

said sealing sleeve including first and second axial ends, each with a sawtooth shaped deformable sealing lip extending radially inward.

7. A pipe connector socket in accordance with claim 6, wherein:

said sealing lip of said second axial end is larger in bulk than said sealing lip of said first axial end.

8. A pipe connector socket in accordance with claim 1, wherein:

said first and second parts of said sealing sleeve have an internal diameter $D_2$ which is greater than said internal diameter $D_1$ of said first and second cylindrical edge sections.

9. A pipe connector socket in accordance with claim 1, wherein:

said sealing flange includes axial ends with annular flanges.

10. A pipe connector socket comprising:

an outer layer with first and second cylindrical edge sections, each of said first and second cylindrical edge sections having an internal diameter $D_1$ substantially equal to each other and substantially constant along an axial length of said each first and second cylindrical edge sections, said axial length of said first cylindrical edge section being larger than said axial length of said second cylindrical edge section, said outer layer defining an inner annular recess between said first and second cylindrical edge sections;

a sealing sleeve positioned inside said outer layer and against said annular recess, said sealing sleeve having sealing means for receiving and sealing pipes inserted from said first and second cylindrical edge sections;

said sealing sleeve including rib means extending radially inward and for blocking movement of a pipe though said sealing sleeve past said rib means, said rib means being axially spaced from said first cylindrical edge section by a first distance which is smaller than a second distance equal to an axial spacing of said rib means from said second cylindrical edge section;

said axial length of said first cylindrical edge section and said first distance is of a magnitude to firmly align said outer layer with a first pipe inserted though said first cylindrical edge section;

said axial length of said second cylindrical edge section and said second distance is of a magnitude for relative angular movement between said outer layer and a second pipe inserted though said second cylindrical edge section;

said sealing sleeve is deformable and said outer layer is harder than said sealing sleeve.

11. A socket as claimed in claim 10, wherein the sealing sleeve has an annular flange at each of its two ends.

12. A pipe connector socket comprising:

an outer layer with first and second cylindrical edge sections, each of said first and second cylindrical edge sections having an internal diameter $D_1$, a first axial length $L_1$ of said first cylindrical edge section being larger than a second axial length $L_2$ of said second cylindrical edge section, said outer layer having an inner surface defining an inner annular recess between said first and second cylindrical edge sections;

a deformable sealing sleeve positioned inside said outer layer and in said annular recess, said sealing sleeve including a plurality of annular ribs extending radially outward between axial ends of said sealing sleeve, said plurality of annular ribs project into said outer layer, radial end faces of the sealing sleeve are flush with an inner surface of the cylindrical edge sections and the two ends of said sealing sleeve are each provided with a sawtooth-like, deformable sealing lip which projects into the interior of the socket.

13. A socket as claimed in claim 12 for connecting two plastic pipes, each having an external diameter $D_r$, wherein the following is applicable to the length $L_1$ of the first edge section:

$$L_1 = 40 (D_1 - D_r).$$

14. A socket as claimed in claim 12 for connecting two plastic pipes, each having an external diameter $D_r$, wherein the following is applicable to the length $L_1$ of the first edge section:

$$L_1 = 80 (D_1 - D_r).$$

15. A socket as claimed in claim 12, wherein the sealing lip facing the second edge section is larger in bulk than the sealing lip facing the first edge section.

16. A socket as claimed in claim 12, wherein the sealing sleeve has a rib which serves as a stop for the two pipes to be connected to one another and which projects into the interior of the socket, and wherein a cylindrical section which is divided by the rib into a shorter part facing the first edge region and a longer part facing the second edge region is present between the two sealing lips.

17. A socket as claimed in claim 16, wherein an internal diameter $D_2$ of the two parts is greater than the diameter $D_1$ of the two cylindrical edge sections.

* * * * *